United States Patent
Perry

(10) Patent No.: US 9,773,032 B2
(45) Date of Patent: Sep. 26, 2017

(54) PROVISION OF INDEX RECOMMENDATIONS FOR DATABASE ACCESS

(75) Inventor: Michael L. Perry, Austin, TX (US)

(73) Assignee: BMC Software, Inc., Houston, TX (US)

(*) Notice: Subject to any disclaimer, the term of this patent is extended or adjusted under 35 U.S.C. 154(b) by 0 days.

(21) Appl. No.: 13/251,190

(22) Filed: Sep. 30, 2011

(65) Prior Publication Data

US 2013/0086038 A1    Apr. 4, 2013

(51) Int. Cl.
*G06F 17/30* (2006.01)

(52) U.S. Cl.
CPC ............... *G06F 17/30306* (2013.01)

(58) Field of Classification Search
CPC ......... G06F 17/30306; G06F 17/30442; G06F 17/30935; G06F 17/30463
USPC ........ 707/999.001, 999.1, 713, 715
See application file for complete search history.

(56) References Cited

U.S. PATENT DOCUMENTS

| | | | |
|---|---|---|---|
| 6,182,079 B1* | 1/2001 | Lenzie | |
| 6,223,171 B1* | 4/2001 | Chaudhuri et al. | 707/718 |
| 6,356,889 B1* | 3/2002 | Lohman | G06F 17/30312 |
| 7,668,804 B1* | 2/2010 | El-Helw | G06F 17/30306 707/719 |
| 7,877,373 B2* | 1/2011 | Zait | G06F 17/30463 707/713 |
| 2001/0014888 A1* | 8/2001 | Tsuchida et al. | 707/2 |
| 2003/0088579 A1* | 5/2003 | Brown et al. | 707/104.1 |
| 2003/0093408 A1* | 5/2003 | Brown et al. | 707/2 |
| 2003/0229635 A1* | 12/2003 | Chaudhuri et al. | 707/6 |
| 2005/0114311 A1* | 5/2005 | Cheng et al. | 707/3 |
| 2005/0187917 A1* | 8/2005 | Lawande et al. | 707/3 |
| 2005/0203940 A1* | 9/2005 | Farrar et al. | 707/102 |
| 2005/0210023 A1* | 9/2005 | Barrera et al. | 707/5 |
| 2007/0192372 A1* | 8/2007 | Bestgen et al. | 707/200 |
| 2010/0082599 A1* | 4/2010 | Graefe et al. | 707/713 |

OTHER PUBLICATIONS

"EZ-Index Analyzer for DB2 on z/OS", Cogito, retrieved from http://web.archive.org/web/20080510144005/http://www.cogito.co.uk/IX_anlz.htm, May 10, 2008, 2 pages.

Singkorapoom, Satid, "DB2 for i5/OS—V5R4 Enhancements for Index Advisor and Autonomic Indexes or Make Your SQL Code Fly in V5R4", IBM, Mar. 2007, 55 pages.

Valentin, Gary et al., "DB2 Advisor: An Optimizer Smart Enough to Recommend Its Own Indexes", retrieved from www.cs.toronto.edu_~alan_papers_icde00.pdf, Feb. 13, 2005, 10 pages.

\* cited by examiner

*Primary Examiner* — Shiow-Jy Fan

(74) *Attorney, Agent, or Firm* — Brake Hughes Bellermann LLP

(57) ABSTRACT

A cost estimator may estimate execution costs for execution of at least one query against a database, using at least one existing index, if any, and based on estimation criteria determined from analyzing the query execution. A candidate index provider may provide candidate indexes, based on the estimation criteria, and re-estimate the execution costs to obtain updated execution costs, using the candidate indexes. An index recommender may recommend a recommended index, based on the updated execution costs.

17 Claims, 11 Drawing Sheets

IXA: View Specifications of Workoad

```
                                                             FILE COMMANDS HELP
       ---------------------------------------------------------------------------------------
       PSSWC140        Recommindex  :  Index Advisor Online Report
1102   Command ===>  _                                              Scroll ===> CSR
                                                                       More:    +>
          Actions: S T H
          TABLE              %                         EL FREE PCT BUFFER       SEG
          NAME            UPDATE    CARDF    NPAGESFR  S  PAGE FREE POOL  C SIZE P
          ---------       -------   -------  --------  -- ---- ---- ------ - ---- -
       -CR_ORDERS            37      9999     99999  E P    0    5  BPO         4
              INDEX                                 U C C                BUFFER  F
              NAME        SAVINGS  #STMTS  RECOMMEND R G D   NLEAF NLVL  POOL   KEY
                          -------  ------  ---------  - - -  ----- ----  ------ ---
1104        -   BMC00008   400910    10     CREATE    D N N    -1   -1   BPO
            -   BMC00009   152102    11     CREATE    D N N    -1   -1   BPO
            -   BMC00007    39760     1     CREATE    D N N    -1   -1   BPO
            -   CRORDDX1        0    27     KEEP      P Y Y    -1   -1   BPO TABLE              %                         E L FREE PCT BUFFER      SEG
          TIME            UPDATE    CARDF    NPAGESF  S R PAGE FREE POOL  C SIZE P
          ---------       -------   -------  -------  --- ---- ---- ------ - ---- -
       _  CR INDIVIDUAL       0      1931     114   E P    2   70  BPO          0
              INDEX                                  U C  C                BUFFER F
                                                                                23
```

FIG. 11

PROVISION OF INDEX RECOMMENDATIONS FOR DATABASE ACCESS

TECHNICAL FIELD

This description relates to the use of indexes to access databases.

BACKGROUND

Databases are used to store vast and increasing quantities of data. Languages exist which enable users to query such databases, so as to identify and retrieve desired data, and to otherwise manage and utilize the databases. For example, the structured query language (SQL) is a well-known language which is often used by database administrators and other users to interact with databases.

Even with the existence of such query languages, database interactions may be lengthy, time-consuming, and prone to error. For example, a user may experience a long wait when attempting to access or retrieve data from a database.

An index and associated techniques are intended to facilitate user interactions with databases, and, in particular, are designed to reduce a wait time experienced by a user in retrieving desired data from a database. For example, in relational databases in which information is stored using a series of rows and a corresponding series of columns, the index may store specified, indexed columns and associated values, to thereby provide a query with a specified row when presented with a specific indexed column value. In these and related scenarios, the index keys are thus the set of columns specified during a creation or modification of an index.

Thus, an index represents a distinct data object or data structure which is stored using a same or different database, and which thus consumes computing resources (e.g., memory resources) in exchange for providing its function of facilitating database access and management. Similarly, other costs may be associated with the creation and use of such an index, such as, for example, slower write times experienced by the database, since writes to the database require corresponding updates to the index.

Thus, indexes generally provide certain benefits, at the expense of certain associated costs, so that the creation, management, and use of an index with respect to a particular query and/or database may or may not provide a net benefit to a user. Moreover, since multiple indexes may be created and used with respect to a single database and/or associated queries, it may occur that such indexes (or combinations thereof) provide varying levels of benefit, if any, with respect to one another.

For example, users may often wish to create and submit a plurality of queries together, such as, for example, when one query uses results of another query, or when results of two or more queries are combined to be used as an input for a third query. In these and many other scenarios, creation and/or selection of one or more indexes may be difficult or impossible, since the various queries may experience very divergent levels of benefit, if any, from the use of specific indexes, or combinations thereof.

Moreover, even if an acceptable or optimal creation/selection of one or more indexes is achieved, it may occur that the user may wish to update or modify the associated queries and/or databases. In such cases, previous analysis performed with respect to index creation/selection may no longer be applicable. Thus, it is problematic to create, select, and/or maintain acceptable, desirable, or optimal indexes for accessing and/or managing databases, which minimize wait time and other execution costs, while providing a user with an ability to easily design and implement database queries in a manner which returns fast and accurate query results.

SUMMARY

According to one general aspect, a computer system may include instructions recorded on a computer-readable medium and executable by at least one processor. The system may include a cost estimator configured to cause the at least one processor to estimate execution costs for execution of at least one query against a database, using at least one existing index, if any, and based on estimation criteria determined from analyzing the query execution. The system may include a candidate index provider configured to cause the at least one processor to provide candidate indexes, based on the estimation criteria, wherein the cost estimator is further configured to re-estimate the execution costs to obtain updated execution costs, using the candidate indexes. The system may include an index recommender configured to cause the at least one processor to recommend a recommended index, based on the updated execution costs According to another general aspect, a computer-implemented method may include estimating execution costs for execution of at least one query against a database, using at least one existing index, if any, and including storing estimation criteria determined from analyzing the query execution. The method may include providing candidate indexes, based on the estimation criteria, and re-estimating the execution costs to obtain updated execution costs, using the candidate indexes. The method may further include recommending a recommended index, based on the updated execution costs According to another general aspect, a computer program product may be tangibly embodied on a computer-readable medium and may include instructions that, when executed, are configured to estimate execution costs for execution of at least one query against a database, using at least one existing index, if any, and including storing estimation criteria determined from analyzing the query execution. The instructions, when executed, may be further configured to provide candidate indexes, based on the estimation criteria, and re-estimate the execution costs to obtain updated execution costs, using the candidate indexes. The instructions, when executed, may be further configured to recommend a recommended index, based on the updated execution costs.

The details of one or more implementations are set forth in the accompanying drawings and the description below. Other features will be apparent from the description and drawings, and from the claims.

BRIEF DESCRIPTION OF THE DRAWINGS

FIG. 11 is a fourth screenshot of the system of FIG. 3.

DETAILED DESCRIPTION

Figure 1:
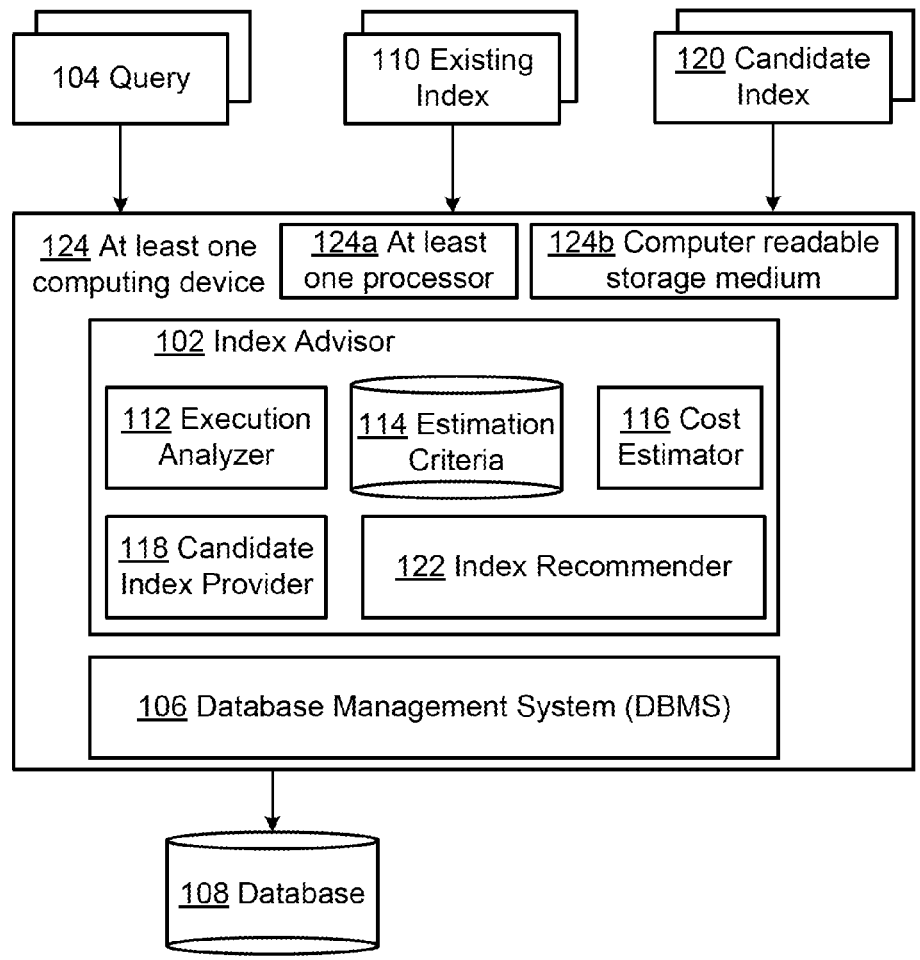
FIG. 1 is a block diagram of a system for providing index recommendations for database queries.

FIG. 1 is a block diagram of a system 100 for providing index recommendations for database queries. Specifically, FIG. 1 provides an example in which indexes which are already present before an index recommendation is required are leveraged as part of the recommendation process. Consequently, the system 100 may provide index recommendations quickly, and in a manner which does not require significant computational resources. Moreover, the system 100 does not require a search of most or all of an entire solution space of possible indexes in order to provide index recommendations.

In the example of FIG. 1, an index advisor 102 is configured to facilitate application of one or more queries 104, by way of a database management system (DBMS) 106, against one or more databases 108. More specifically, as just referenced above, and as described in detail herein, the index advisor 102 may be configured to leverage the presence of existing indexes 110, which are present at a time an index recommendation is required, to thereby select or create a suitable index for the DBMS 106 to utilize when applying the one or more queries 104 against the database 108.

In example implementations of the system 100, the queries 104, the database management system 106, and the database 108 may represent, except as described otherwise herein, virtuaany conventional example of queries, database management systems, and/or databases which may exist in the art. For example, the database 108 may represent a relational database used to store information about individual persons or other entities, along with associated values or attributes thereof. For example, the database 108 may represent a database of customers of a business, along with information regarding demographic statistics of the customers and/or purchase histories thereof. In other examples, the database 108 may represent an inventory of a business, or virtually any other information in which individual items or entities are desired to be stored in relation with values or attributes thereof.

Thus, the queries 104 may be understood to represent virtually any operation which seeks to extract desired information from the database 108. For example, the queries 104 may seek to extract specific rows from the database 108 which have values specified in the query corresponding to values of specified columns within the database 108. For example, in the examples above, the queries 104 may request identities of customers having certain values or attributes as specified within the query 104.

Meanwhile, the DBMS 106 may generally be understood to be configured to facilitate application of the queries 104 against the database 108, and otherwise to create, modify, utilize, or manage the database 108. For example, the DBMS 106 may be associated with, or may implement, a particular query language, such as the structured query language (SQL), designed to facilitate the various functionalities of the DBMS 106. Thus, for example, in addition to applying the queries 104 against the database 108, the DBMS 106 may be configured to create new tables for the database 108, to join, split, delete, or otherwise modify tables of the database, or individual cells or rows/columns thereof.

Moreover, the DBMS 106 may be understood to execute various functionalities related to the creation, management, and use of indexes as part of operations associated with applying the queries 104 against the database 108. For example, as referenced above, such indexes, e.g., the existing indexes 110, generally represent discrete data structures in which aspects of the database 108 which are considered likely to be accessed by the queries 104 are stored in a structured manner, which enables the DBMS 106 to quickly locate the specified data within the larger database 108. In this way, for example, such indexes may be utilized to assist the DBMS 106 in locating desired information, without having to scan an entirety of the database 108.

In practice, however, such indexes do not always provide a desired type or extent of benefit, and in some cases may be associated with a net loss of efficiency of the system 100. For example, if an index is created which identifies a column of the database 108 as an index key which contains an identical value throughout much or all of the database 108, then the corresponding index may provide little or no benefit, since the DBMS 106 will be required to scan virtually all of the database 108 despite the existence of the index. In such a case, such an index may represent a net cost or loss of benefit, considering, e.g., the resources necessary to create and maintain the index.

Still further, related difficulties in constructing and utilizing such indexes are exacerbated when a plurality of the queries 104 are applied against the database 108 in conjunction or in combination with one another. For example, an index which may be highly selective and useful for a first query may not provide any benefit for a second query. In such cases, a separate index which provides a certain degree of benefit for both queries together may provide a relative net benefit, even if the separate index provides a relatively smaller benefit with respect to the first query individually. Consequently, it is desirable to create and/or select indexes which are most useful for a particular execution of the system 100.

Thus, to address these and other scenarios related to the creation, use, and management of indexes, the index advisor 102 may be configured to provide the DBMS 106 with one or more indexes which are suitable for use in applying the queries 104, including specified combinations thereof, against the database 108. Additionally, or alternatively, the index advisor 102 may be configured to provide a report listing two or more recommended indexes, for selection there between by a user of the system 100.

In operation, the index advisor 102 may include an execution analyzer 112 which is configured to perform an analysis of the query 104 together with the manner in which the query 104 is applied against the database 108 by the DBMS 106, including the manner in which the DBMS 106 utilizes the existing indexes 110 in so doing. For example, as is well known, although the query 104 specifies what information is being requested from the database 108, the query 104 does not generally provide the specific manner in which the DBMS 106 should obtain that information. For example, in a simplified example, as referenced above, it may occur that an index of the existing indexes 110 may be specified or available for use in facilitating a search of the database 108 in connection with a pair of queries 104, but that doing so will result in a net loss of efficiency or value as compared to simply executing a full table scan of the database 108. In such cases, the DBMS 106 may elect not to use the index in question, and instead may elect to use a different index, or no index at all.

More generally, the DBMS 106 may be configured to select and implement a specific access path specifying a manner in which data is retrieved from the database 108. Generally speaking, the DBMS 106 may select such an access path based on, e.g., available access paths for the query in question, and/or an estimated cost of executing the query, using each individual access path, or combinations thereof.

For example, the DBMS 106 may determine which access paths are available, in conjunction with examining predicates of the query 104. In general, such predicates generally are portions of the query 104 according to which expressions are evaluated as true or false based on a value or other aspect of specified data. The nature and use of such predicates are discussed in more detail below, but, in general, it is known that such predicates may be utilized by the DBMS 106 to select from available access paths within the database 108, whereupon the DBMS 106 may proceed to generate one or more potential execution plans using available access paths, and to select a specific execution plan based on an estimated cost (e.g., in terms of execution time and/or processing cycles) for the query 104 in question.

Thus, although the index advisor 102 is illustrated separately from the DBMS 106 in the example of FIG. 1, it may be appreciated that, in various example implementations, the index advisor 102 may be implemented in whole or in part by the DBMS 106, and/or may leverage or otherwise utilize existing functionalities of the DBMS 106 in providing index recommendations. For example, as just referenced, the DBMS 106 may provide various functionalities for identifying and selecting suitable access paths and associated execution plans. The DBMS 106 also may utilize various techniques for exposing the selected access paths/execution plans, together with reasons and criteria utilized in the selection thereof, for use by an operator of the system 100. For example, as is known, and as described in detail below with respect to FIG. 2, the DB2 database system may utilize the "explain" or "dynamic explain" functionality associated with that system, and related systems, to identify and expose information related to operations of the DBMS 106 in selecting access paths/execution plans for the one or more queries 104.

Thus, in the index advisor 102, the execution analyzer 112 may utilize such functionality related to the DBMS 106 to analyze the selected access paths/execution plans, and to determine relevant information associated therewith. For example, as referenced, the execution analyzer 112 may determine predicates and other aspects or characteristics of the query 104, as well as various related statistics regarding past usages of the existing indexes 110, and other information which may be relevant to determining an effectiveness of the existing indexes 110 with respect to the queries 104, as well as to estimating an associated cost of such executions.

Such information may be stored as estimation criteria 114. Then, a cost estimator 116 may be utilized to access the estimation criteria 114 to determine execution costs associated with the use of each of the existing indexes 110 in conjunction with the queries 104. Again, as referenced above, it may be appreciated that some or all of the functionalities associated with the execution analyzer 112 and the cost estimator 116 may be provided in conjunction with operations of the DBMS 106. Consequently, although illustrated separately for the sake of clarity and understanding, it may be advantageous to utilize existing functions and features of the DBMS 106 when implementing at least a portion(s) of the execution analyzer 112 and/or the cost estimator 116.

Further, a candidate index provider 118 may be configured to utilize the estimation criteria 114 to construct candidate indexes 120. For example, as described in detail below, the candidate index provider 118 may be configured to select an existing index 110 and enhance the existing index, e.g., by adding one or more additional columns thereto and thereby provide desired or suitable index keys which increase a selectivity of the enhanced existing index with respect to the relevant queries 104. In other example implementations, the candidate index provider 118 may utilize the estimation criteria 114 to create an entirely new index for inclusion as a candidate index 120.

Subsequently, features and functions of the execution analyzer 112 and the cost estimator 116 may again be utilized to provide similar analyses as described above, but this time including the candidate indexes 120. Based on results of such analysis, an index recommender 122 may be configured to recommend one or more indexes for use by the DBMS 106 in applying the queries 104 against the database 108. For example, in some implementations, the index recommender 122 may automatically select the most-recommended index for use by the DBMS 106. In other example implementations, the index recommender 122 may output a report to a user of the system 100, where the report may include a plurality of recommended indexes, perhaps provided in an association with relevant tables of the database 108, for selection there between by the operator of the system 100.

In the example of FIG. 1, the index advisor 102 and the DBMS 106 are illustrated as being executed using at least one computing device 124, which is illustrated as including at least one processor 124a and a computer readable storage medium 124b. Thus, for example, instructions for executing the index advisor 102 and/or the DBMS 106 may be stored using the computer readable storage medium 124b, and may be executed by the at least one processor 124a. For example, a plurality of processors, operating on one or more computing devices 124, may execute instructions stored on the computer readable storage medium 124Bbin parallel, to thereby to implement the features and functions of the system 100 in a fast and efficient manner.

Various other implementations of the system 100 may be designed and executed by one of skill in the art. For example, the system 100 may be implemented in a distributed computing environment, e.g., in which the at least one computing device 124 includes multiple computers in communication with one another over a network. More generally, it may be appreciated from the example of FIG. 1 that any single component thereof may be implemented using multiple instances thereof, and/or may be implemented using two or more sub-components implementing some functions thereof. Conversely, any two or more components of the system 100 may be combined for execution thereof as a single, joined component. Still further, additional or alternative components, not specifically illustrated in the example of FIG. 1, some of which are illustrated and described below, also may be included.

Figure 2:
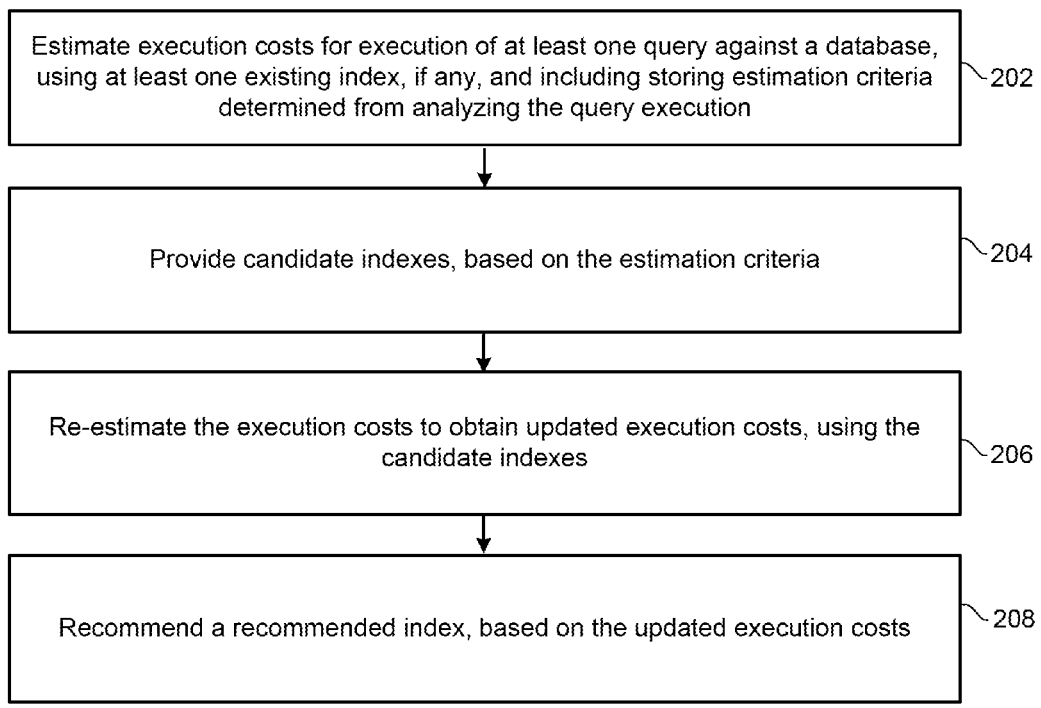
FIG. 2 is a flowchart illustrating example operations of the system of FIG. 1.

FIG. 2 is a flowchart 200 illustrating example operations of the system 100 of FIG. 1. In the example of FIG. 2, operations 202-208 are illustrated as separate, sequential operations. However, it may be appreciated that in various alternate embodiments, two or more of the operations 202-208 may be implemented in a partially or completely overlapping or parallel manner, or may be implemented in a nested, iterative, or looped fashion. Further, additional or alternative operations may be included, and/or one or more operations may be omitted.

In the example of FIG. 2, execution costs for execution of at least one query against a database may be estimated, using at least one existing index, if any, and including storing estimation criteria determined from analyzing the query execution (202). For example, the execution analyzer 112 may, as described herein, analyze the query 104 and an execution thereof with respect to the database 108, and using one or more of the existing indexes 110, assuming at least one such index is available. For example, the execution analyzer 112 may utilize statistics regarding previous usages of the existing indexes, may include predicates or other aspects of the query 104, and/or may utilize relevant access paths and/or execution plans constructed by the DBMS 106. As described, it may be advantageous to include existing indexes 110; however, the system 100 may function using the estimation criteria even if the estimation criteria is constructed without use of the existing indexes (e.g., if no existing indexes are present). As a result, the execution analyzer 112 may be configured to store resulting estimation criteria 114.

Consequently, candidate indexes may be provided, based on the estimation criteria (116). For example, the cost estimator 116 may be configured to estimate an execution cost of the query 104, using the one or more existing indexes 110. For example, the cost estimator 116 may measure such execution costs in terms of a number of seconds required to provide query results from the database 108. In other example implementations, the cost estimator 116 may provide execution costs in terms of input/output processing cycles of the at least one processor 124a. In still other examples, the cost estimator 116 may provide the execution costs in terms of a combination, e.g., a weighted combination, of seconds and cycles. In the latter example, the DB2 database system may utilize the timeron, which is a unitless combination of (execution time in seconds) and (number of input/output cycles).

The execution costs may be re-estimated to obtain updated execution costs, using the candidate indexes (206). For example, the execution analyzer 112 may be configured to further populate the estimation criteria 114, and the cost estimator 116 may be configured to utilize the updated estimation criteria 114 to provide updated execution costs. In this regard, operations of the execution analyzer 112 and the cost estimator 116 may generally be understood to be similar or the same as previous operations thereof executed with respect to only the existing indexes 110. However, as described, such operations may include, e.g., may be based on, inclusion of the candidate indexes 120.

A recommended index may be recommended, based on the updated execution costs (208). For example, the index recommender 122 may be configured to provide one or more of the existing indexes 110 and/or the candidate indexes 120, wherein it may be appreciated that the recommended index or indexes may generally have the lowest execution cost, as calculated by the cost estimator 116.

Figure 3:
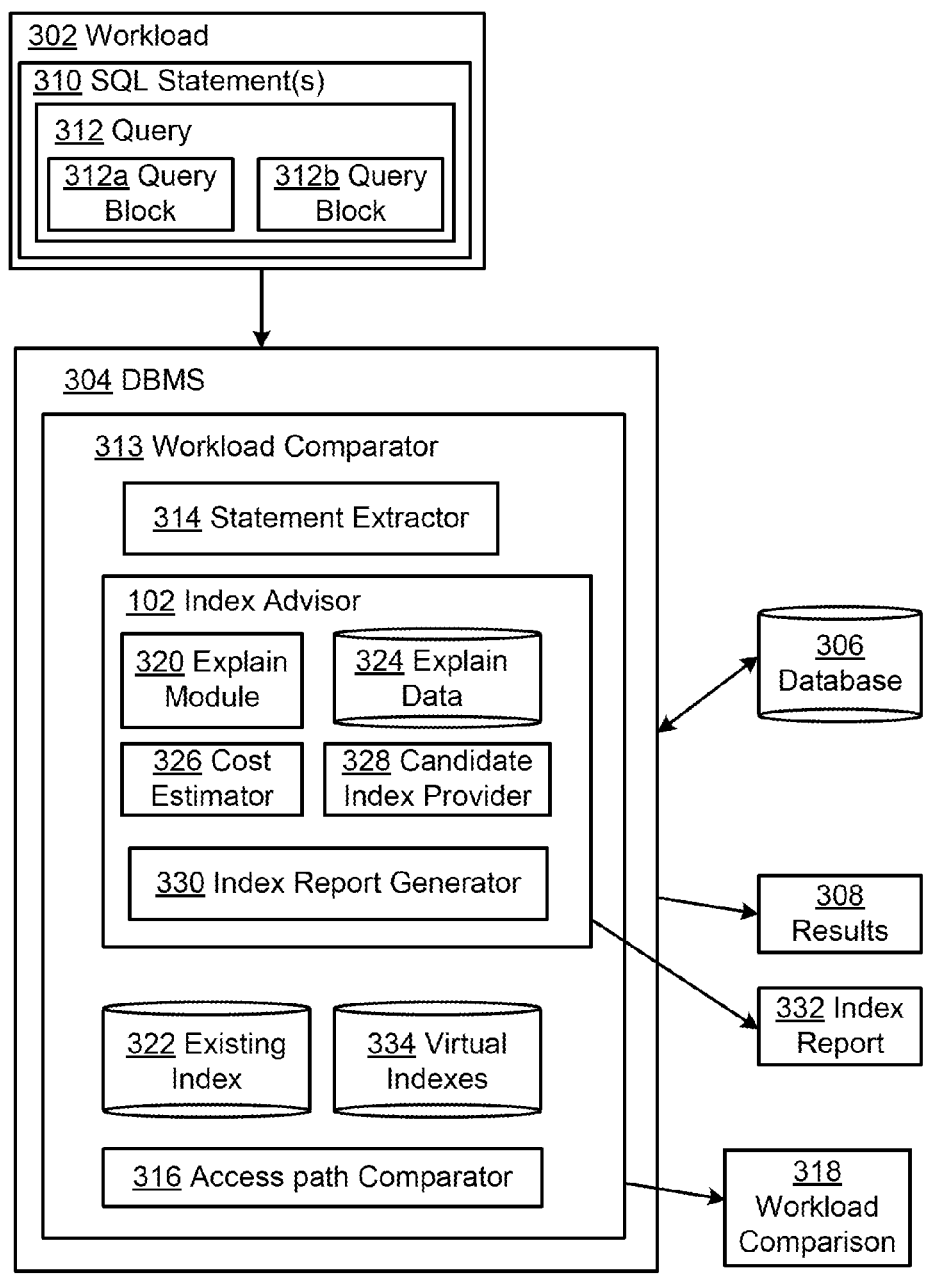
FIG. 3 is a block diagram of a more detailed example implementation of the system of FIG. 1

FIG. 3 is a block diagram of a system 300 illustrating a more detailed example implementation of the system 100 of FIG. 1. In the example of FIG. 3, a workload 302 is applied by a DBMS 304 against a database 306, to thereby obtain query results 308. As is generally well known, the workload 302 may include a plurality of SQL statements 310, which define and include a plurality of queries 312, each of which may include one or more query blocks illustrated in FIG. 3 as query blocks 312a, 312b.

In the example of FIG. 3, the DBMS 304 is illustrated as including a workload comparator 313. In this regard, the workload comparator 313 may be understood to be configured to perform comparisons between two or more workloads 302. For example, an operator of the system 300 using the workload 302 may wish to modify or update the workload 302. However, in so doing, associated optimizations of the first workload may be mitigated or lost. Moreover, such difficulties in modifying or updating workloads may be difficult for an operator of the system 300 to identify within any specificity, and therefore may be difficult for the operator to correct.

Therefore, the workload comparator 313 may be configured to enable the operator of the system 300 to test desired modifications or updates of the workload 302, and to thereby design and implement a version of the workload 302 which is executed in a desired fashion. For example, as shown, the workload comparator 313 may include a statement extractor 314 which may be configured to extract the plurality of SQL statements 310 from the workload 302. Subsequently, as illustrated, an instance of the index advisor 102 may be utilized to recommend, and ultimately provide, a desirable or suitable index for use by, or in conjunction with, application of the query blocks 312a, 312b against the database 306. In this way, for example, a level of execution costs associated with executing the workload 302 against the database 306 may be determined. Subsequently, the desired modified/updated workload 302 may be examined by the statement extractor 314 for extraction of corresponding SQL statements 310 therefrom. Again, the index advisor 102 may be configured to recommend or provide a suitable index for application of the workload 302 against the database 306.

In this way, an access path comparator 316 may be utilized to compare access paths associated with application of the first workload 302 against the database 306 using the first recommended index, relative to application of the second workload 302 against the database 306, using the second-recommended index. In this way, the operator of the system 300 may be enabled to meaningfully compare potential executions of two or more workloads 302 relative to each other. In the example of FIG. 3, the workload comparator 313 may thus be configured to output a workload comparison 318, which may be utilized by an operator of the system 300 to select a desired workload implementation.

In the context of FIG. 3, the index advisor 102 may provide many or all of the features and functions described above with respect to FIG. 1. Also in the context of FIG. 3, as referenced above with respect to FIG. 1, the index advisor 102, and the workload comparator 313 as a whole, may be implemented utilizing, or within, the DBMS 304. For example, as described herein, and as is generally well known, the DBMS 304 may include conventional functionality for attempting to optimize a selection of an access path and associated execution plan for use in a subsequent execution of the workload 302 with respect to the database 306. The DBMS 304 also may provide associated functionality for analyzing the results of such access path optimizations.

For example, in the context of the DB2 database system, an optimizer or query optimizer module may be configured to select an access path and associated execution plan based on estimated or potential execution costs associated with the future prediction of the workload 302 in question against the database 306. Since it may be difficult for users of the system 300 to recognize and understand the results of such optimizations, or desired optimizations (e.g., the user may not understand why a particular index was selected or not selected for use in executing the query), the DB2 database system may provide the above-referenced explain or dynamic explain functionality for exposing rationales and results associated with operations of the DBMS 304 in selecting an access path and/or execution plan.

Consequently, the index advisor 102 of FIG. 3 may be configured to leverage or otherwise utilize such existing functionalities of the DBMS 304. Additionally or alternatively, however, in other example implementations, it may be appreciated that the index advisor 102 may use entirely separate or divisible code when executing the various features and functions described herein.

In the example of FIG. 3, however, the index advisor 102 is illustrated as including an explain module 320. That is, the explain module 320 may be configured to implement, or to leverage implementation by the DBMS 304 of, the known explain or dynamic explain functionality of the DB2 database management system. In general, the explain module 320 may be understood to provide detailed information about the access path and associated execution plan chosen for the SQL statements 310 by the DBMS 304. In this way, the explain module 320 may consider the use of existing indexes 322 by the DBMS 304 in designing and constructing a corresponding access path and/or execution plan. Consequently, the explain module 320 may output explain data 324 as an example of the estimation criteria 114 of FIG. 1.

For example, the explain data may include, e.g., a specified sequence of operations defined by the DBMS 304 to process queries of the SQL statements 310. Explain data 324 may further include predicates and selectivity estimates for predicate(s) of the SQL statements 310. The explain data 324 also may include statistics for objects referenced in the SQL statements 310 at the time that the explain data 324 is obtained, including, e.g., the existing indexes 322.

In these regards, as referenced above, it may be appreciated that such predicates used to evaluate expressions may include various operators (e.g., =, >, <, IN, BETWEEN, WHERE). Further, such predicates may be combined with one another, e.g., using the AND or OR operator(s).

A cost estimator 326 may be configured to utilize the explain data 324 to determine execution costs associated with implementation of the workload 302 against the database 306, using the existing indexes 322. As referenced above, the DBMS 304, e.g., the optimizer or query optimizer referenced above, may calculate and utilize such cost information as part of the process of defining and selecting an access path and associated execution plan for execution of the workload 302 against the database 306. Thus, the cost estimator 326 may leverage or otherwise utilize such operations of the DBMS 304, to thereby determine an execution cost associated with the explain data 324 and the underlying workload 302, when utilizing the existing indexes 322.

By utilizing the thus-obtained explain data and associated execution costs, the candidate index provider 322 may be configured to determine whether one or more of the existing indexes 322 will be suitable for use by the access path comparator 316 for selecting between two or more workloads in the context of the workload comparator 313. For example, as described in detail below, the candidate index provider 328 may utilize various measures of index selectivity, e.g., the filter factor, to evaluate the existing indexes 322. If the candidate index provider 328 determines that one of the existing indexes 322 is suitable, then the index report generator 330 may provide an index report 332 which sets out the resulting one or more indexes, perhaps in relationship to relevant tables of the database 306.

However, if the candidate index provider 328 does not determine that one of the existing indexes 322 is suitable, or sufficiently suitable, then the candidate index provider 328 may proceed with constructing candidate indexes which may be suitable. For example, as described in detail below with respect to FIG. 5, the candidate index provider 328 may be configured to enhance or modify selected ones of the existing indexes 322, and/or create entirely new candidate indexes. In the example of FIG. 3, the candidate index provider 328 may store resulting candidate indexes as virtual indexes 334. In this regard, it may be appreciated that the virtual indexes 334 represent indexes which are available to the components of the index advisor 102, but which are not available for use by other sessions or instances of the DBMS 304 (e.g., for use in applying separate queries, not shown in FIG. 3, against the database 306).

Subsequently, the explain module 320 and the cost estimator 326 may be configured to generate new explain data 324 and associated costs required by the workload 302. In this iteration, the additional candidate indexes included within the virtual indexes 334 are considered for evaluation for possible use thereof by the access path comparator 316.

Thus, as described in detail below, e.g., with respect to FIG. 6, the index report generator 330 may be configured to select indexes from one or both of the existing indexes 322 and the virtual indexes 334, to thereby output an index report 332. For example, the index report generator 330 may recommend indexes based on associated execution costs, as well as on relative levels of selectivity of the indexes when applying the workload 302 against the database 306. In this way, as described, an operator of the system 300 may be provided with suitable indexes for use in implementing the workload comparisons, e.g., between two or more updated, modified, or new workloads.

Figure 4:
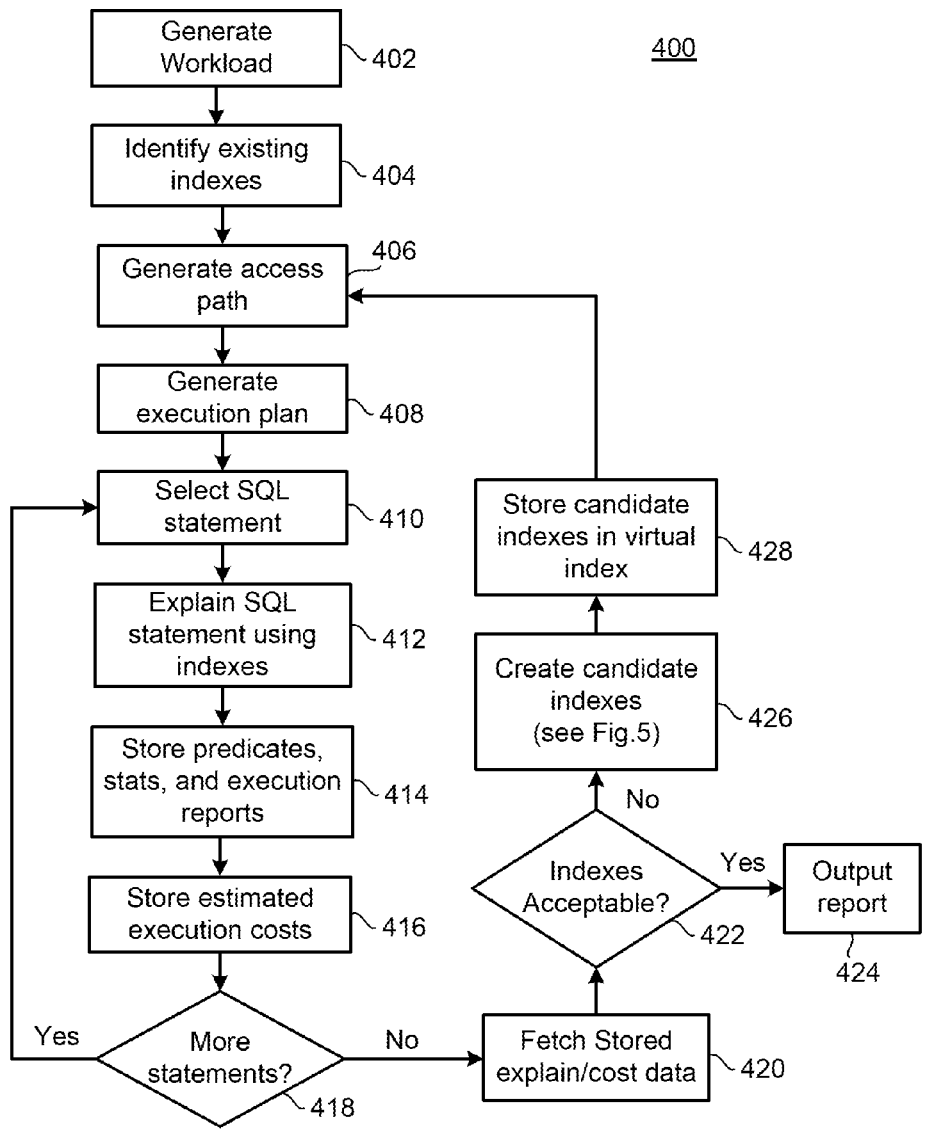
FIG. 4 is a flowchart illustrating more detailed example operations of the system of FIG. 1.

FIG. 4 is a flowchart 400 illustrating more detailed example operations of the system 300 of FIG. 3. In the example of FIG. 4, a workload, e.g., the workload 302, may be generated (402). For example, for testing purposes, representative workloads may be generated which have been previously used, or which are hypothetical and constructed for testing purposes (e.g., may be chosen to be representative of future workloads, including anticipated variations thereof. For example, the workload may anticipate scenarios in which a volume of queries and/or database records may be high, e.g., during seasonal variations experienced by businesses in selling their merchandise).

In some example implementations, workloads may be generated in conjunction with associated execution counts, whereas execution counts generally refer to metrics characterizing a number of times at a particular query/query block of a given SQL statement, or portions thereof, is/are executed against the database 306. As described below, such execution counts may be useful in calculating a total or overall cost savings with respect to the creation and selection of one or more indexes.

Existing indexes 322 may be identified (404), and the DBMS 304 may proceed with generating an access path (406) and associated execution plan (408). Subsequently, an iterative loop may commence in which a first SQL statement of the workload is selected (410), whereupon the explain module 320 may proceed with explaining the selected SQL statement, here in the context of the existing indexes 322 (412).

As referenced above, the explain module 320 may proceed to store identified predicates and other relevant information within the explain data 324. For example, in the example of FIG. 4, the explain data 324 also may include sort data characterizing sort keys characterizing a manner in which query results are to be sorted or otherwise ordered. Further, in the example, the explain data 324 may include the above-referenced execution counts associated with queries/query blocks of the SQL statement in question.

Additionally, estimated execution costs may be stored (416). For example, as described herein, the cost estimator 326 may leverage cost calculations made by the DBMS 304 to determine estimated execution costs for the workload 302 when using the existing indexes 322 to generate the access path/execution plan.

If more SQL statements remain (418), then the iterative loop may proceed with selection of any subsequent SQL statements (410). Once all SQL statements of the workload have been selected, and have had associated estimation/execution costs stored within the explain data 324, then the candidate index provider 328 may proceed by fetching the stored explain/cost data (420). In the example, and as referenced herein, if the existing indexes are chose to be acceptable (422) by the candidate index provider 328, then the index report generator 330 may be configured to proceed with providing the index report 332 (424). For example, in conjunction with the stored explain/cost data, the index report generator 330 may evaluate the existing indexes based on their relative levels of selectivity with respect to application of the workload 302 against the database 306.

If none of the existing indexes are chose to be suitable, then the candidate index provider may proceed with creating candidate indexes (426). As referenced above, an example operation for providing candidate indexes is described below with respect to FIG. 5.

Subsequently, the thus-created candidate indexes may be stored in the virtual index history 334 (428). As described, inclusion in the virtual indexes 332 enables subsequent use of the candidate indexes in the operations of the explain module 320, the cost estimator 326, the candidate index provider 328, and the index report generator 330, without actually making the candidate indexes within the virtual indexes 334 available for a current, actual application of the workload 302, or other workloads implemented by the DBMS 304.

Specifically, as shown, the flowchart 400 may proceed with generation of updated access paths/execution plans (406, 408), followed by subsequent iteration through the SQL statements 310 of the workload 302 again (410-416). Once all of the SQL statements 310 have been considered (418), the candidate index provider 328 may fetch the resulting stored explain/cost data (420), and the index report generator 330 may judge whether the resulting set of existing indexes 322 and previously generated candidate indexes include a suitable number and extent of acceptable indexes (422). For example, the index report generator 330 may compare relative execution costs associated with each index. In so doing, and in cases where the generated workload includes execution counts for individual statements/queries or portions thereof, the index report generator 330 may weight relative savings in execution costs based on the execution counts. That is, for example, a given savings in execution costs for a specific query or operation thereof may be considered to be more valuable when the query/operation is executed numerous times and the savings are thus multiplied.

In some implementations, the index advisor 102 may be configured to stop operations after this second iteration of the candidate index provider 328 in judging acceptability or suitability of available indexes. However, in other example implementations, the index advisor 102 may proceed through additional iterations of the flowchart 400, including creation of additional candidate indexes for storage within the virtual indexes 334, as described above.

Once a suitable number and quality of acceptable indexes have been determined (422), the index report generator 330 may proceed with outputting the index report 332. In this way, as described, the operator of the system 300 may select one or more desired indexes from the index report 322, for use by the workload comparator 313 in a subsequent evaluation of the workload 302 relative to a subsequent or different workload 302.

That is, as may be appreciated from the above description, the workload comparator 313 may proceed with workload comparison operations with respect to a subsequent or different workload, not specifically or separately illustrated in the example of FIG. 3. Thus, the workload comparator 313 may proceed with operations of the statement extractor 314 and the index advisor 102 with respect to the subsequent or new workload. In this way, two or more workloads may be compared relative to one another, and, in so doing, may be assured of being compared in the context of the implementation of each workload using a suitable or acceptable index provided by the index advisor 102 and the index report 332.

Further, because, for example, the index advisor 102 seeks to leverage or otherwise utilize the existing indexes 322, and is configured to construct the candidate index provider 328 using the explain data 324 and associated costs data associated with analysis of a given workload 302 in the context of the existing indexes, the index advisor 102 may be enabled to provide a very fast selection of suitable indexes, and without requiring a large amount of computing resources in order to do so. In this way, for example, the index advisor 102 may be utilized on a fairly frequent basis, to select or otherwise determine an acceptable index, even when underlying workloads 302 have been altered or updated.

Figure 5:
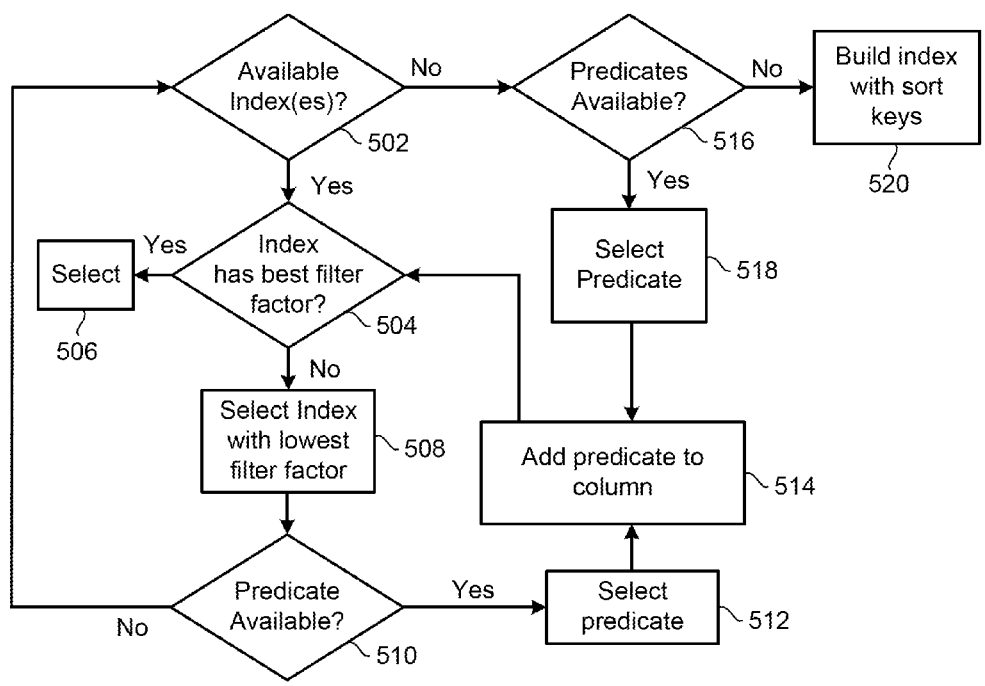
FIG. 5 is a flowchart illustrating example operations for providing candidate indexes.

FIG. 5 is a flowchart 500 illustrating example operations for providing candidate indexes. As referenced above, creation of candidate indexes, e.g., by the candidate index provider 118 of FIG. 1, and also the candidate index provider 328 of FIG. 3, may begin by checking whether any indexes, e.g., existing indexes 110/322, are available (502). If such indexes are available, the candidate index provider 118/328 may determine whether any or all of the available indexes have a best possible filter factor (504).

In this context, the term filter factor, with respect to a given table/database, generally refers to a ratio of a number of rows of the table/database which provide a query result when using the available index in question to conduct a search, relative to a total number of rows of the table/database. In other words, the filter factor generally represents a percentage of available table rows which will provide a hit or matching result when the available index in question is utilized to search the table/database.

Thus, relatively low filter factors may be desirable, inasmuch as a low filter factor thus generally corresponds to a high selectivity of the index in question. In other words, low filter factors imply that only a few, or perhaps only one, result(s) will be returned when the available index is utilized. Thus, in the example of FIG. 5, if a filter factor of an available index being considered is equal to (one/number of table rows), then the index in question cannot be more selective, and, consequently, the available index may be selected (506) for use in analyzing relevant workloads.

On the other hand, if the filter factor is greater than (one/number of table rows) (504), then the candidate index provider 118/328 may select an index from the available indexes which has the lowest available filter factor (508). Then, if no predicate is available within the explain data 324 of FIG. 3 (or estimation criteria 114 of FIG. 1), then the candidate index provider 118/328 may proceed with selecting from among the available indexes (506).

If however, predicates are available (510), e.g., are included in the queries being analyzed, then the candidate index provider 118/328 may select a predicate from among the available predicates (512), and may thereafter add a selected predicate as a column to the previously-selected index with the lowest filter factor (514). In other words, in this way, the candidate index provider 118/328 may serve to cause the previously selected index to be relatively more selective, e.g., to have a lower filter factor, than before the selected predicate was added thereto.

Consequently, the candidate index provider 118/328 may proceed with determining again whether the thus-created candidate index has a best filter factor (504), e.g., a filter factor of (one/number of table rows). If so, then the resulting one or more such indexes may be selected (506). If not, operations may proceed with again selecting the one or more indexes with the lowest filter factor (508), in determining whether additional predicates are available (510), for selection thereof (512), and addition thereof as a column to the most recently selected indexes (514). Thus, it may be appreciated that the operations 504-514 may be repeated until either a candidate index is obtained having a lowest possible filter factor, or until no remaining predicates are available for use in modifying or enhancing existing indexes.

Thus, the above described operations 502-514 may be understood to represent techniques for modifying or enhancing existing indexes, in order to obtain candidate indexes having relatively lower, and potentially optimal, filter factors. However, either at a beginning or some later point in the operations of FIG. 5, it may occur that no indexes are available for use in the processes of the flowchart 500 of FIG. 5 (502). For example, even if existing indexes are present, the candidate index provider 118/328 may determine that no such indexes are presently available or suitable for use in any modification or enhancement thereof to obtain candidate indexes. Additionally, or alternatively, in the example of FIG. 5, it may occur that early operations attempting to enhance or modify existing indexes may fail to produce a sufficiently selective and/or sufficient number of candidate indexes. In such scenarios, when no remaining existing indexes are available for modification or enhancement thereof (502), then the candidate index provider 118/328 may proceed with creating new candidate indexes.

For example, as shown, the candidate index provider 118/328 may proceed with determining whether predicates are available (516), as described above with respect to the operation 510. If so, as described above with respect to the operation 512, the candidate index provider 118/328 may select a predicate from the available predicate (518), and may add the selected predicate as a column (e.g., as a first column) of a candidate index being constructed (514).

If the resulting, created candidate index has an optimal filter factor (504), then the created candidate index may be selected (506). If not, operations may proceed as described above, but this time utilizing the newly created candidate indexes.

If no remaining indexes are available (502), and no remaining predicates are available (516), then in such scenarios it may not be feasible to obtain or construct any candidate index having an optimal filter factor. For example, the candidate index provider may utilize the estimation criteria 114 and/or the explain data 324 to obtain sort keys associated with the queries of the workload in question. Then, the candidate index provider 118/328 may proceed to build one or more candidate indexes using the obtained sort keys (520). Although not specifically illustrated in the example of FIG. 5, it may be appreciated that the resulting candidate indexes may be subject to the same operations or types of optimizations and related analysis described above.

Figure 6:
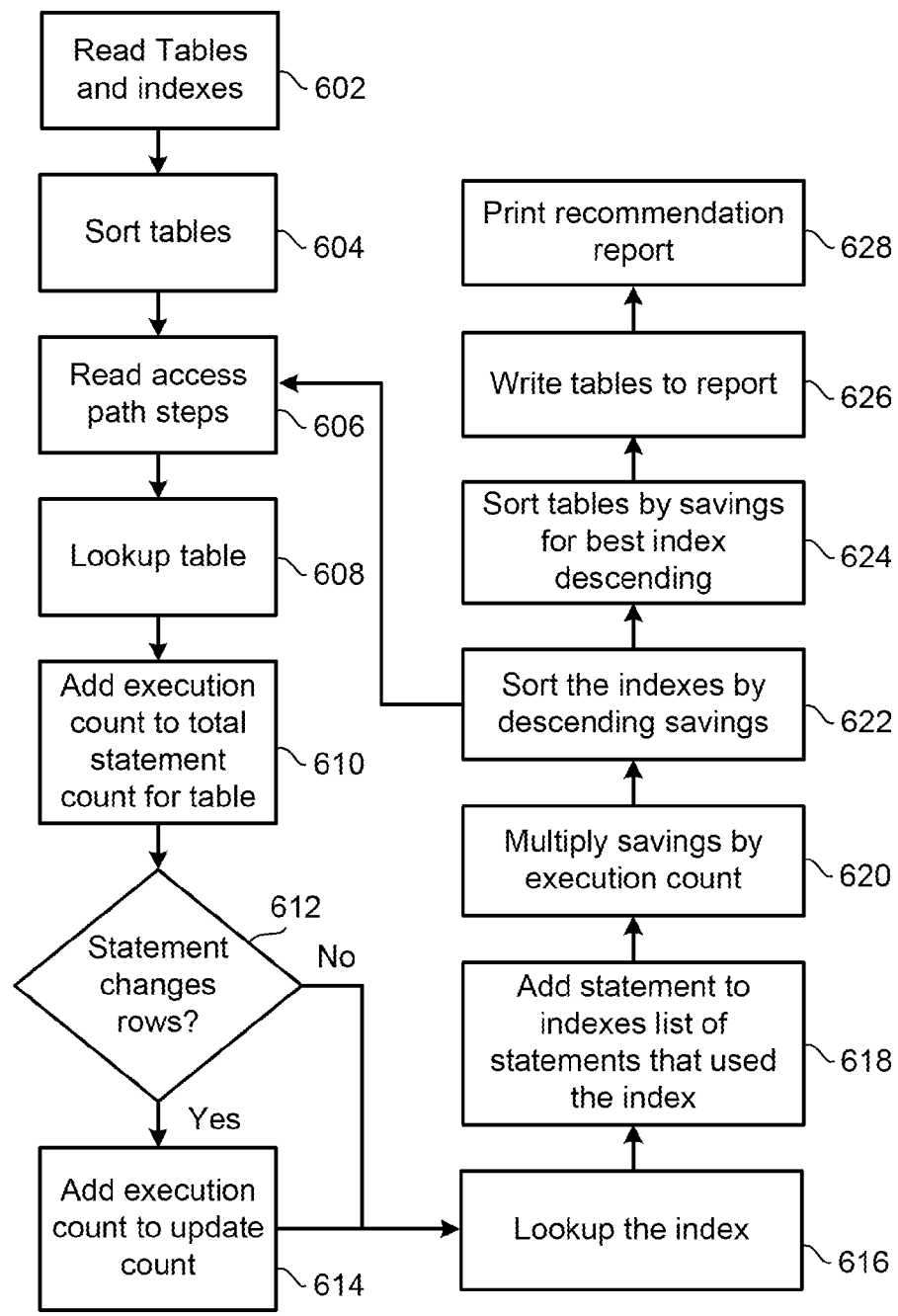
FIG. 6 is a flowchart illustrating example operations for generating an index recommendation report.

FIG. 6 is a flowchart 600 illustrating example operations of the index report generator 330 of FIG. 3. In the example of FIG. 6, it is assumed for the sake of example that the index report generator 330 has access to relevant database tables, workload data, explain data 324, and candidate indexes from the virtual indexes 334.

Consequently, the index report generator 330 may read the relevant tables and indexes (602), and may sort the tables in a desired manner (604), e.g., based on a name or identification of a creator/operator of the system 300.

The index report generator 330 may read each relevant access path step (606), and may look up a first table specified therein (608). The associated execution count may then be added to the total execution account for the table in question (610). In cases where the SQL statement changes rows in the table (e.g., includes operations such as insert, update, delete, merge, or truncate) (612), then the associated execution account may be added to the corresponding update count (614).

If, however, no rows are changed (612), or after addition of the relevant execution count to the corresponding update account (614), then the index associated with the table within the access path may be identified from memory (616). The relevant SQL statement may be added to the selected indexes listed SQL statements that use the index (618).

As referenced above, relative savings in execution cost may be utilized to judge indexes relative to one another, and execution counts of, e.g., individual query blocks or queries may, in effect, multiply any relative savings, since the relative savings are obtained each time execution occurs (e.g., each time an execution count occurs). Consequently, as shown in FIG. 6, the relative savings may be multiplied by the corresponding execution count (620). Subsequently, the indexes may be sorted by descending savings (622).

As shown in FIG. 6, access path steps may continue to be read (606), until all tables and associated indexes have been selected and analyzed (608-622). Then, the tables of the access path steps may be sorted based on the estimated savings and execution costs, and the tables may be sorted by savings for the best indexes in a descending order (624).

Subsequently, the tables may be written to a report to be generated. At this time, additional elements may be written to the report, using the information determined as described above. For example, the indexes, key columns, statement names, and statement text may be included in, or written to, the report (626).

Finally in FIG. 6, the resulting index recommendation report may be printed (628). For example, as shown above with respect to FIG. 3, the index report generator 330 may generate the index report 332 for use by the operator of the system 300 in ultimately selecting one or more desired indexes.

Figure 7:
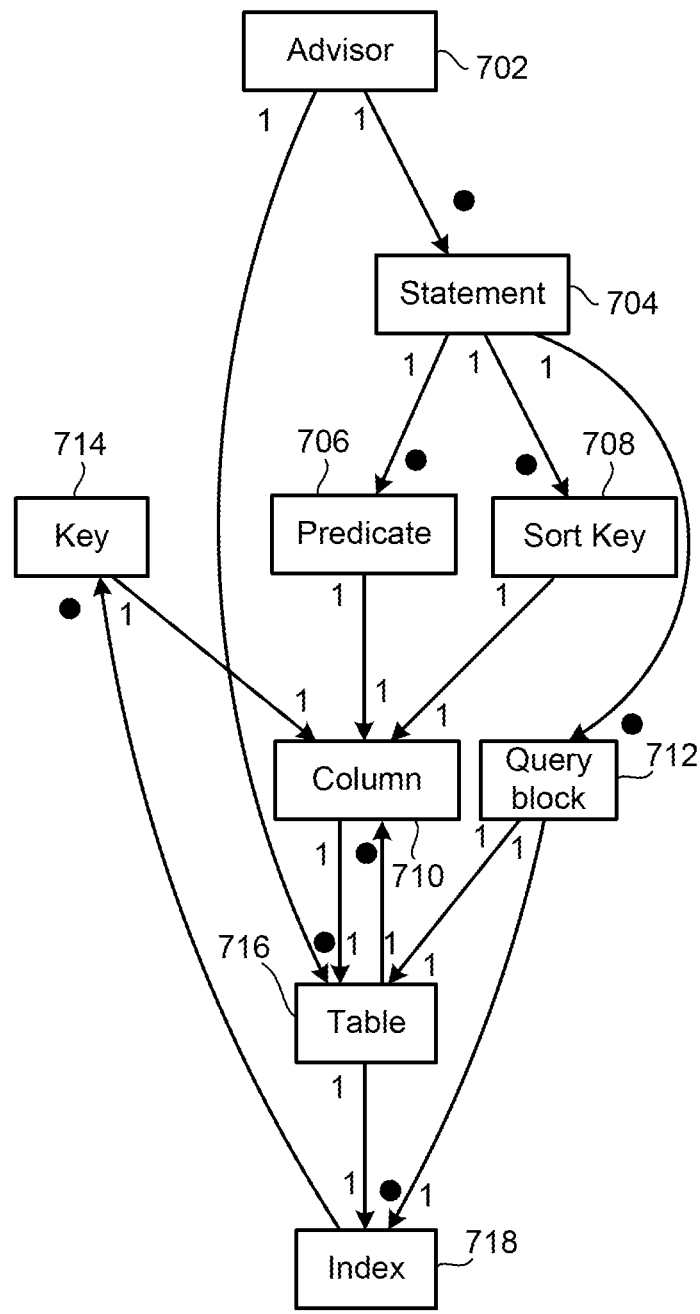
FIG. 7 is a block diagram of a data structure used in the systems of FIGS. 1 and 3.

FIG. 7 is a diagram 700 illustrating relationships between data structures utilized in the systems and methods of FIGS. 1-6. In the example of FIG. 7, as shown, an index advisor structure 702 may have a one-to-many relationship with statements 704, and a one-to-many relationship with database tables 716. As also shown, each statement 704 may have a one-to-many relationship with predicate 706, sort keys 708, and query blocks 712. On the other hand, the predicates 706 and sort keys 708 have a one-to-one relationship with each column 710. Similarly, each column 710 has a one-to-many relationship with each of the tables 716, and, each table 716 has a one-to-many relationship with each column 710. However, each query block 712 has a one-to-one relationship with the table 716.

Further in FIG. 7, each index 718 has a one-to-one relationship with each table 716. That is, each index may be associated with a single table, although, as described herein, it is possible for a single table to have more than one index. Each index further has a one-to-one relationship with each query block 712. Finally in the example of FIG. 7, each index 718 has a one-to-many relationship with each key 714.

Figure 8:
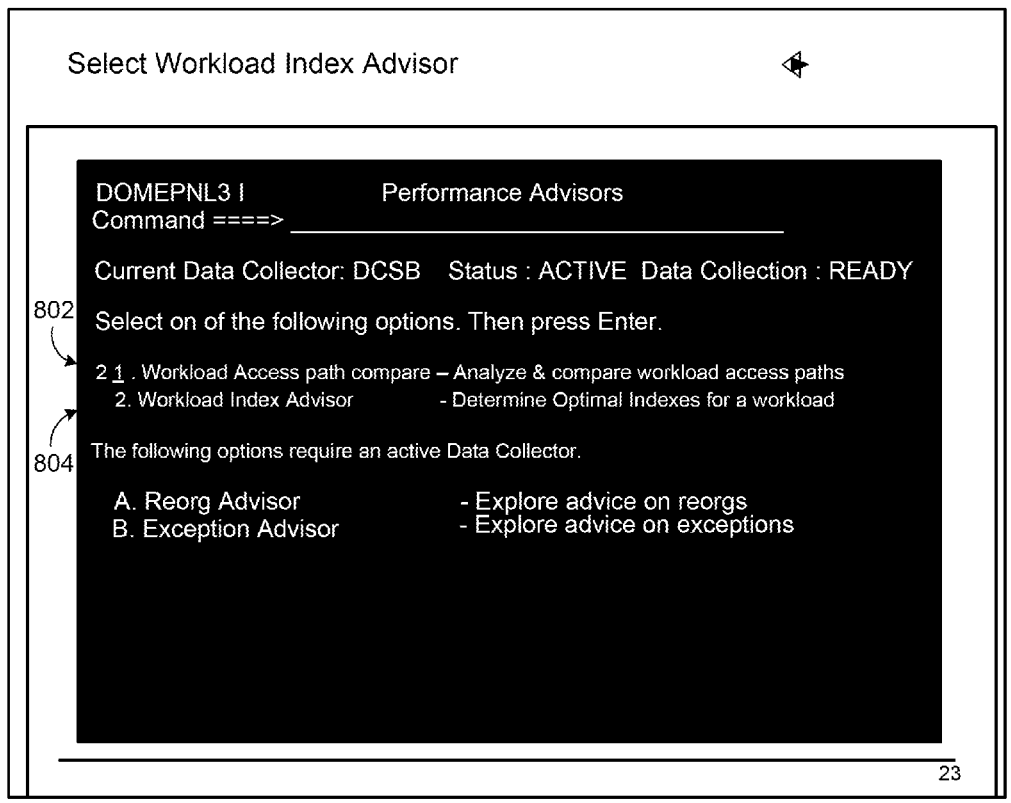
FIG. 8 is a first screenshot of the system of FIG. 3.

FIGS. 8-11 illustrate example screenshots of example implementations of the index advisor 102. In the example of FIG. 8, a section 802 enables a user to initiate the type of workload access path comparisons described above with respect to FIG. 3. Meanwhile, the portion 804 enables the operator to select initiation of the index advisor 102, so as to determine optimal indexes for each associated workload, as described herein. In FIG. 8, the portion 804 is illustrated as having been selected.

Figure 9:
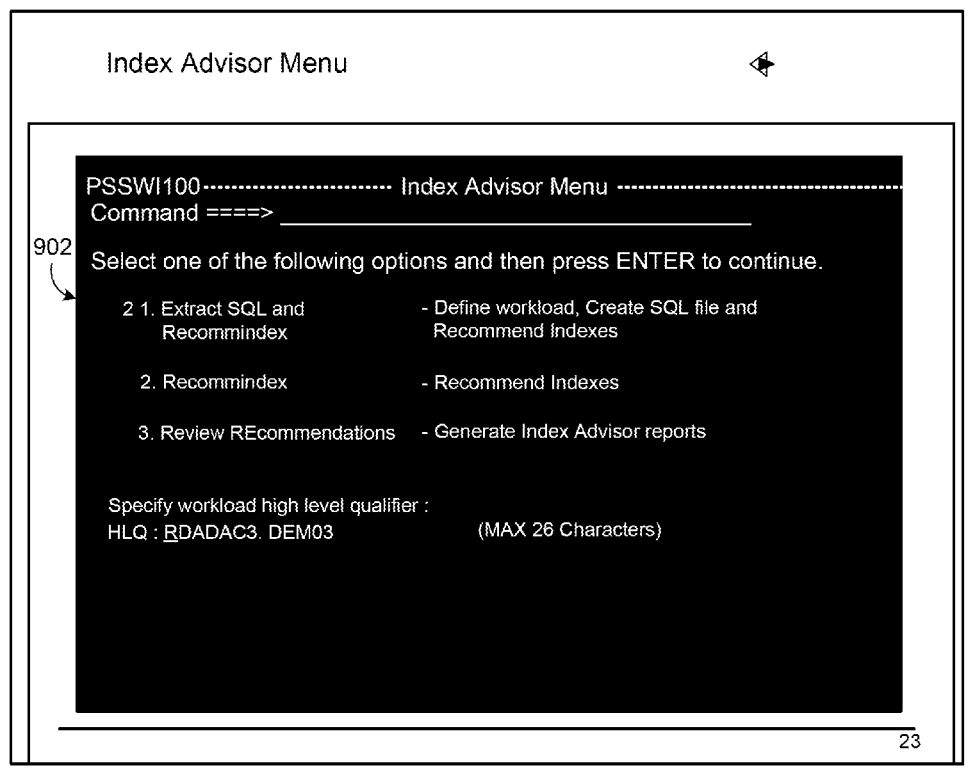
FIG. 9 is a second screenshot of the system of FIG. 3.

In the example of FIG. 9, a portion 902 illustrates the type of three step process described above with respect to generation of index reports. Specifically, a first step may include the statement extraction from the available workload, and associated analysis thereof in the context of considering and recommending indexes from an available pool of existing indexes. Thus, as shown, the user may be enabled to define a specific workload, created an associated SQL file, and proceed with an initial index recommendation. Meanwhile, a second step may be associated with the type of creation of candidate indexes described above, while a third step is associated with actual generation of index reports.

Figure 10:
FIG. 10 is a third screenshot of the system of FIG. 3.

Consequently, in FIG. 10, a portion 1002 enables the operator to select a workload process. Meanwhile, a portion 1004 references potential workloads, together with various parameters or characteristics thereof.

FIG. 11 illustrates an example index report. Specifically, as shown, a portion 1102 illustrates a specific table, while a portion 1104 illustrates various recommended indexes recommended for the table of the portion 1102. As may be appreciated from the above description of FIG. 6, the index report of FIG. 11 may include a number of tables, each provided in conjunction with a number of recommended indexes.

As shown in the example, the portion 1104 may include various indexes, along with associated execution cost savings which may be obtained in conjunction with use thereof. The portion 1104 also specifies a number of statements associated with each index, and indicates whether the recommended index would need to be created (e.g., would need to be created based on the candidate index corresponding thereto and previously stored as a virtual index), or simply may be kept from existing indexes.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system comprising:
   at least one processor; and
   instructions recorded on a non-transitory computer-readable medium and executable by the at least one processor, the system including
   a candidate index provider configured to cause the at least one processor to send a request to a cost estimator of a query optimizer of a database management system and receive, from the cost estimator and in response to the request, execution costs estimated by the cost estimator for execution against a database of a query workload having a plurality of queries, using at least one existing index, and based on estimation criteria determined by an execution analyzer of the query optimizer from analyzing the query workload as a whole, and further configured to cause the at least one processor to provide candidate indexes, based on the estimation criteria, wherein the candidate index provider is further configured to cause the at least one processor to transmit, to the cost estimator, a second request, to utilize the candidate indexes to re-estimate the execution costs to obtain updated execution costs for the query workload as a whole, using the candidate indexes; and
   an index recommender configured to cause the at least one processor to receive the updated execution costs in response to the second request, and recommend a recommended index, based on the updated execution costs,
   wherein the candidate index provider is configured to provide the candidate indexes including adding at least one query predicate selected from at least one query of the query workload for inclusion within the estimation criteria as a column of the at least one of the candidate indexes, and wherein the at least one query predicate includes at least two query predicates, and the candidate index provider is further configured to provide at least one of the candidate indexes including iteratively adding a query predicate of the at least two query predicates thereto, until a selectivity threshold is reached.

2. The system of claim 1, wherein the execution analyzer is configured to analyze at least one access path for applying the plurality of queries against the database, to thereby provide the estimation criteria.

3. The system of claim 2, wherein the execution analyzer is configured to extract predicates from the plurality of queries for inclusion within the estimation criteria.

4. The system of claim 1, wherein the candidate index provider is configured to provide at least one of the candidate indexes including enhancing an existing index of the at least one existing index.

5. The system of claim 1, wherein the candidate index provider is configured to provide at least one of the candidate indexes including creating a new index based on the estimation criteria.

6. The system of claim 1, wherein the candidate index provider is configured to provide at least one of the candidate indexes based on sort keys governing a sorted order of query results and included within the estimation criteria.

7. The system of claim 1, wherein the query workload is associated with at least one access path for applying queries of the query workload against the database.

8. The system of claim 7, wherein the database management system comprises a workload comparator configured to compare execution costs of the at least one access path of the query workload with the updated execution costs of at least a second access path of a second query workload, the second access path using a second recommended index provided by the index recommender.

9. The system of claim 8, wherein the workload and the second workload include execution counts enumerating a number of times that corresponding operations of the workloads are executed, and wherein the workload comparator is configured to weight the relative execution costs using the execution counts when comparing the access paths thereof.

10. The system of claim 1, wherein the execution costs are calculated in terms of a number of seconds required to complete execution of the at least one query against the database, a number of processing cycles of the at least one processor required to complete execution of the at least one query against the database, and/or combinations thereof.

11. A computer-implemented method, comprising:
   sending a request to a cost estimator of a query optimizer of a database management system for estimated execution costs for execution against a database of a query workload having a plurality of queries, using at least one existing index, and based on estimation criteria determined by an execution analyzer of the query optimizer from analyzing the query workload as a whole;
   receiving, in response to the request, the execution costs calculated by the cost estimator for the plurality of queries of the query workload;
   determining candidate indexes for the plurality of queries of the query workload,
   based on the estimation criteria, including adding at least one query predicate selected from the query workload for inclusion within the estimation criteria as a column of the at least one of the candidate indexes;
   transmitting a second request to the cost estimator to re-estimate the execution costs to obtain updated execution costs for the query workload as a whole, using the candidate indexes;
   receiving the updated execution costs in response to the second request; and
   recommending a recommended index, based on the updated execution costs, including evaluating existing indexes and candidate indexes based on a selectivity thereof with respect to application of the at least one query in conjunction therewith against the database,
   wherein the at least one query predicate includes at least two query predicates, and wherein providing at least one of the candidate indexes includes iteratively adding a query predicate of the at least two query predicates thereto, until a selectivity threshold is reached.

12. The method of claim 11, at least one of the candidate indexes is provided based on sort keys governing a sorted order of query results and included within the estimation criteria.

13. The method of claim 11, wherein providing the candidate indexes comprises providing at least one of the candidate indexes including enhancing an existing index of the at least one existing index.

14. A computer program product, the computer program product being tangibly embodied on a non-transitory computer-readable medium and comprising instructions that, when executed, are configured to:
  send a request to a cost estimator of a query optimizer of a database management system, estimated execution costs for execution against a database of a query workload having a plurality of queries, using at least one existing index, and based on estimation criteria determined by an execution analyzer of the query optimizer from analyzing the query workload as a whole;
  receiving, in response to the request, the execution costs calculated by the cost estimator for the plurality of queries of the query workload;
  determine candidate indexes for the plurality of queries of the query workload,
  based on the estimation criteria, including adding at least one query predicate selected from the at least one query for inclusion within the estimation criteria as a column of the at least one of the candidate indexes;
  transmit a second request to the cost estimator to re-estimate the execution costs to obtain updated execution costs for the query workload as a whole, using the candidate indexes;
  receive the updated execution costs in response to the second request; and
  recommend a recommended index, based on the updated execution costs, including evaluating existing indexes and candidate indexes based on a selectivity thereof with respect to application of the at least one query in conjunction therewith against the database,
  wherein the at least one query predicate includes at least two query predicates, and wherein providing at least one of the candidate indexes includes iteratively adding a query predicate of the at least two query predicates thereto, until a selectivity threshold is reached.

15. The computer program product of claim 14, wherein the execution analyzer is configured to analyze at least one access path for applying the query workload against the database, to thereby provide the estimation criteria.

16. The computer program product of claim 14, wherein the instructions, when executed, are further configured to provide at least one of the candidate indexes including enhancing an existing index of the at least one existing index.

17. The computer program product of claim 14, wherein the instructions, when executed, are further configured to provide at least one of the candidate indexes including creating a new index based on the estimation criteria.

* * * * *